(12) United States Patent
Verduijn

(10) Patent No.: US 7,767,192 B1
(45) Date of Patent: Aug. 3, 2010

(54) NANOMETER-SIZED MOLECULAR SIEVE CRYSTALS OR AGGLOMERATES AND PROCESSES FOR THEIR PRODUCTION

(75) Inventor: Johannes Petrus Verduijn, Leefdaal (BE)

(73) Assignee: Exxonmobil Chemical Patents Inc., Houston, TX (US)

( * ) Notice: Subject to any disclaimer, the term of this patent is extended or adjusted under 35 U.S.C. 154(b) by 0 days.

(21) Appl. No.: 08/656,725

(22) Filed: Jun. 3, 1996

Related U.S. Application Data

(63) Continuation of application No. 08/211,873, filed as application No. PCT/EP92/02386 on Oct. 19, 1992, now abandoned.

(30) Foreign Application Priority Data

Oct. 23, 1991 (GB) .................................. 9122499.8
Jun. 3, 1992 (GB) .................................. 9211745.6

(51) Int. Cl.
*C01B 39/04* (2006.01)
*C01B 39/38* (2006.01)

(52) U.S. Cl. .................. 423/702; 423/705; 423/707; 423/716

(58) Field of Classification Search ............ 423/702, 423/705, 707, 716, DIG. 22, DIG. 27, DIG. 29
See application file for complete search history.

(56) References Cited

U.S. PATENT DOCUMENTS

| 3,516,786 | A |   | 6/1970  | Maher et al. |           |
|-----------|---|---|---------|---------------|-----------|
| 3,702,886 | A | * | 11/1972 | Argauer et al.| 423/705   |
| 3,781,226 | A |   | 12/1973 | Schwartz      | 252/455 Z |
| 3,926,782 | A |   | 12/1975 | Plank et al.  | 208/135   |
| 3,968,024 | A |   | 7/1976  | Gorring et al.| 208/111   |
| 3,992,466 | A |   | 11/1976 | Plank et al.  | 260/671 C |
| 4,263,126 | A |   | 4/1981  | Rollmann      | 208/14    |
| 4,606,901 | A |   | 8/1986  | Chu et al.    |           |
| 4,642,226 | A | * | 2/1987  | Calvert et al.| 423/706   |
| 4,801,476 | A |   | 1/1989  | Dunsmuir et al.|          |
| 5,318,766 | A |   | 6/1994  | Vaughan et al.|           |
| 5,672,331 | A | * | 9/1997  | Verduijn      | 423/702   |
| 5,772,980 | A | * | 6/1998  | Sul et al.    | 423/705   |
| 5,863,516 | A | * | 1/1999  | Otterstedt et al.| 423/700|

FOREIGN PATENT DOCUMENTS

| DE | 1194828 | 6/1965 |
| EP |  173895 | 3/1986 |
| GB | 1049363 | 5/1963 |
| JP | 1153514 | 6/1989 |
| JP | 7042996 | 6/1989 |

OTHER PUBLICATIONS

Zeolite Molecular Sieves (Breck), John Wiley and Sons, New York, 1974, pp. 305 and 383.
"Effect of Crystallite Size on the Activity and Poison Resistance of a Shape-Selective Zeolite" I and EC Res., 1991, 30, pp. 12-18.

* cited by examiner

*Primary Examiner*—David M Brunsman
(74) *Attorney, Agent, or Firm*—Darryl M. Tyus

(57) ABSTRACT

A molecular sieve comprising crystals or agglomerates of average diameter 100 nanometers or less, which molecular sieve has a crystal or agglomerate size distribution such that the variance in the longest dimension is less than 15% of the average longest dimension, and which is capable of forming a collodial suspension, may be prepared by producing a boiling aqueous synthesis mixture of a silica source and an organic structure directing agent in the form a hydroxide in an amount sufficient to cause substantially complete dissolution of the silica source, and crystallizing the solution at 120° C. or less. The crystal size may be controlled by selection of an appropriate crystallization temperature.

26 Claims, 9 Drawing Sheets

FIG.1
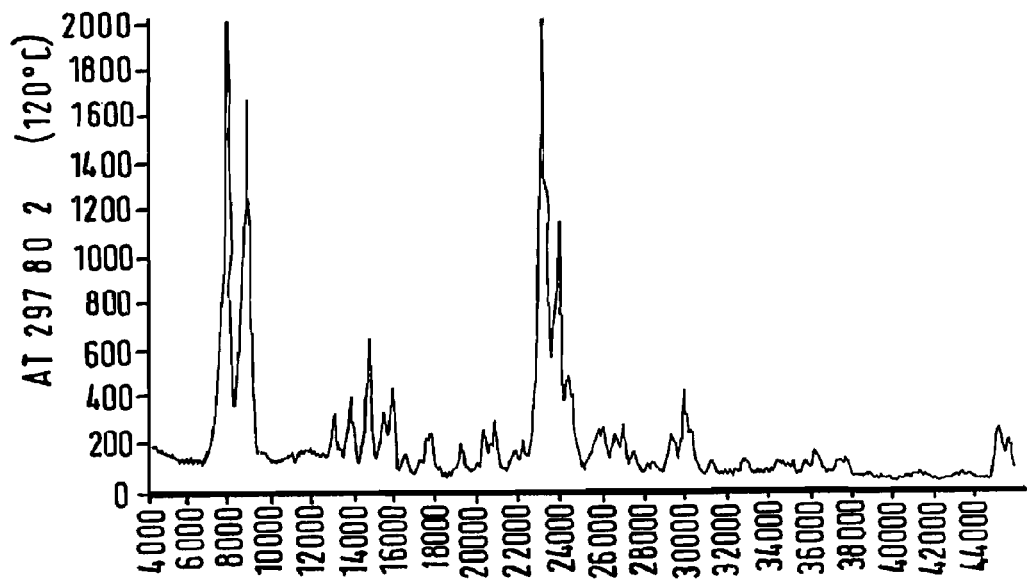
120° CRYSTALS
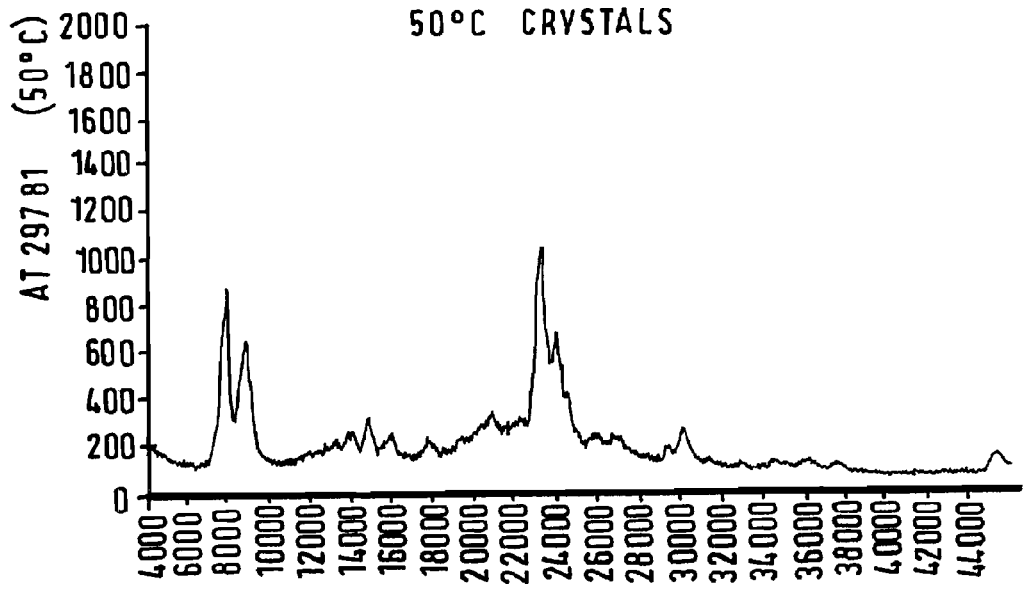
50°C CRYSTALS

EFFECT OF SYNTHESIS TEMP. ON MFI-CRYSTALLITE SIZE

FIG. 3
MAGNIFICATION : 104,000 *
720°C — CRYSTALS
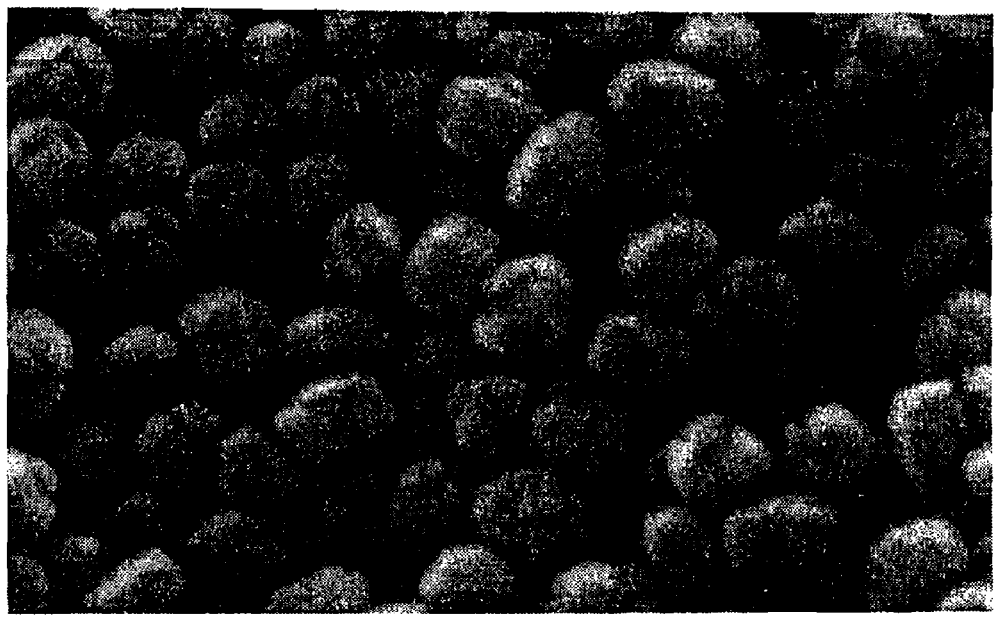
50°C — CRYSTALS
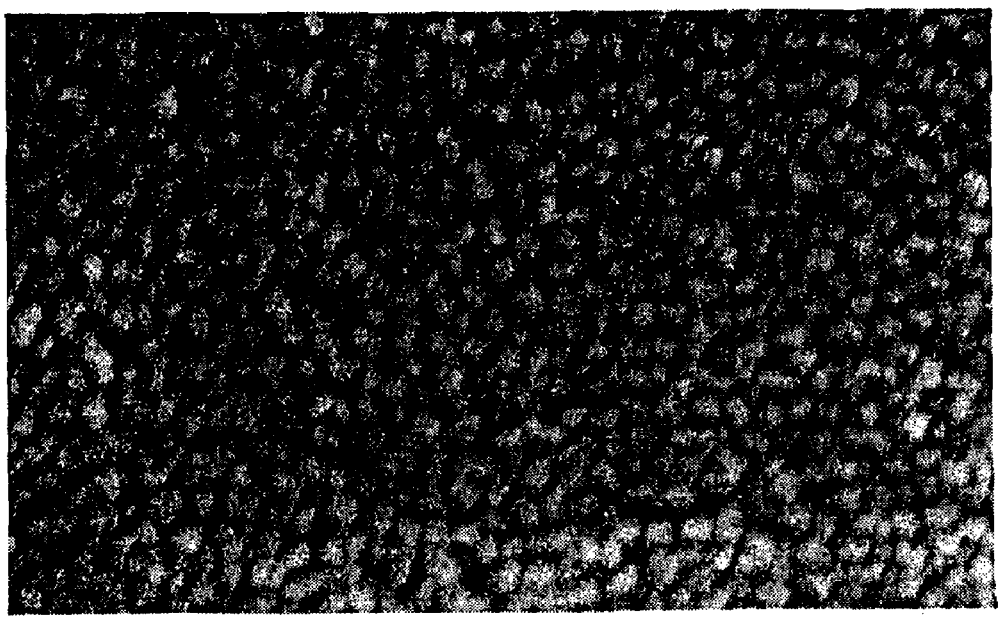

FIG. 4
COMPARATIVE 140 000 * SEM MICROGRAPHS
SILLICATE - 1 PRE AGED AT 50°C
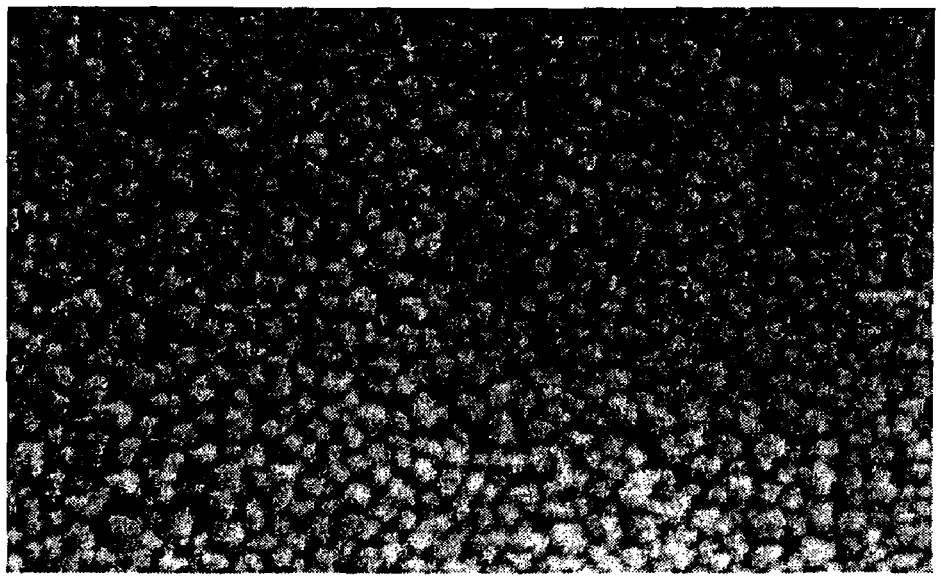
SILLICATE - 1 PRE AGED
AT 50°C FOLLOWED BY 100°C CRYSTALLISATION
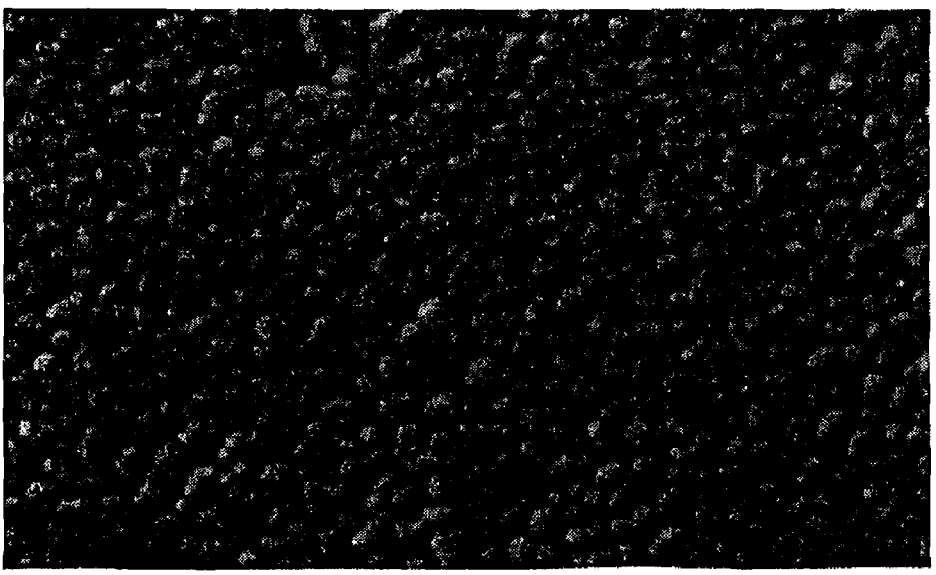

FIG. 5
XRD OF PRODUCT DRIED AFTER SYNTHESIS
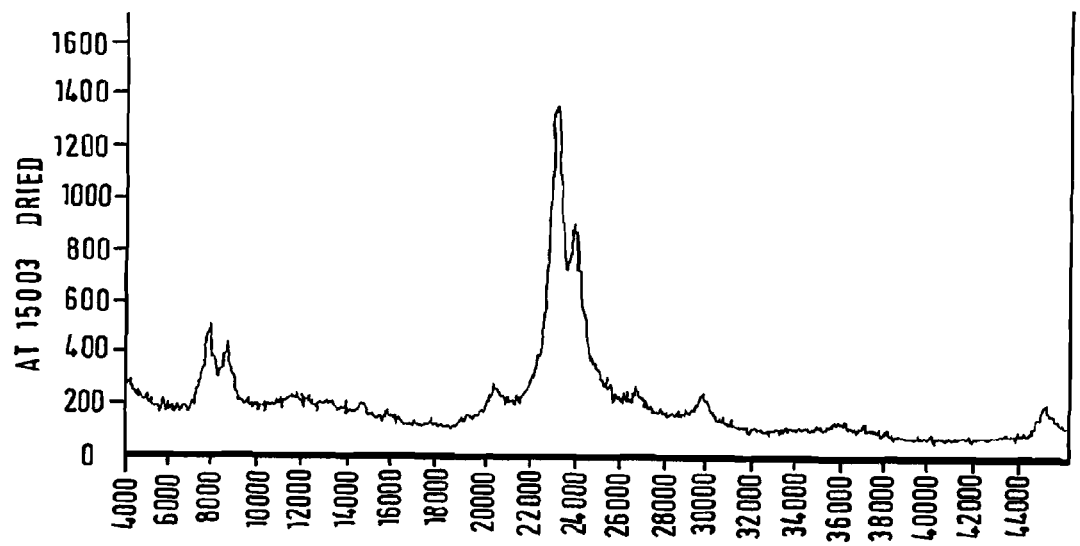
MAGNIFICATION 104,000 *

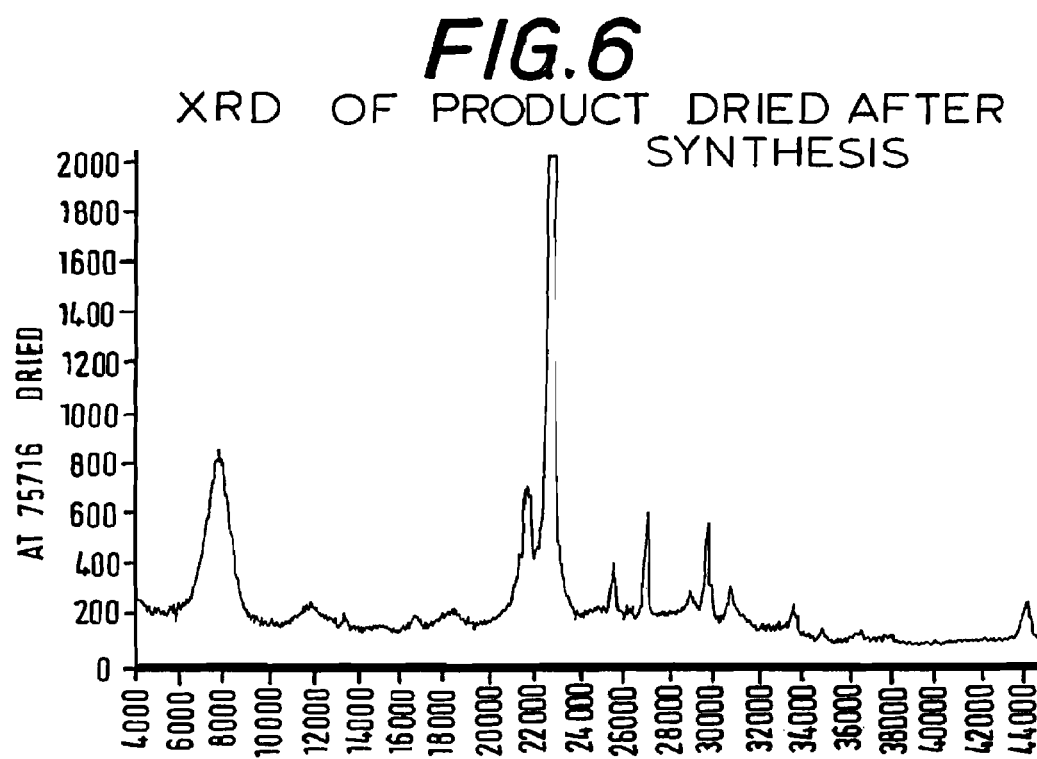
FIG.6
XRD OF PRODUCT DRIED AFTER SYNTHESIS
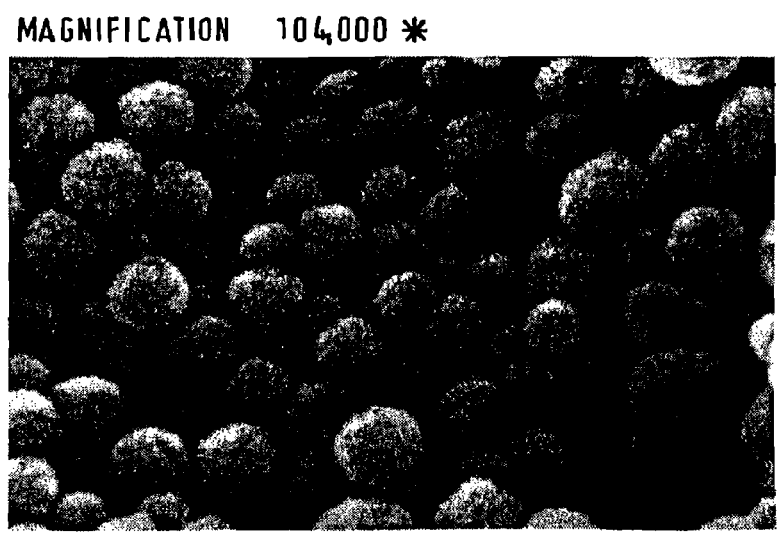

MICROGRAPH SHOWING AGGLOMERATES WITH SIZES BETWEEN 0·3 AND 1·5 μm

MAGNIFICATION : 10,000 ✻

MAGNIFICATION : 10,000 *

MICROGRAPH SHOWING AGGLOMERATES WITH A SIZE BETWEEN 0·2 AND 1·5 μm

NANOMETER-SIZED MOLECULAR SIEVE CRYSTALS OR AGGLOMERATES AND PROCESSES FOR THEIR PRODUCTION

This application is a continuation of Ser. No. 08/211,873, filed Jun. 3, 1994, ABN, which is a 371 filing of PCT/EP92/02386 filed Oct. 19, 1992.

BACKGROUND OF THE INVENTION

The present invention relates to a molecular sieve comprising crystals or agglomerates whose average largest dimension is of the order of nanometers, and processes for its production.

Molecular sieves are microporous crystalline materials which find many uses in chemical processes. Zeolites, generally based on crystalline aluminosilicate, are a well known class of molecular sieve. For some purposes, the use of small zeolite crystals or agglomerates of crystals is desirable and the intrinsic quality of the zeolite generally improves as the crystal size is reduced. For commercial purposes it is desirable that the crystal or agglomerate size is substantially uniform and the production of small crystal molecular sieves should be accurate and reproducible with respect to the crystal size. It would also be useful for some purposes if the crystals or agglomerates were sufficiently small and uniform that the molecular sieve was capable of forming a colloidal suspension. The applicants have identified a new form of molecular sieve which solves these problems. The applicants have also identified a controllable way to produce such material.

The production of molecular sieves having small crystals has been described in a number of documents. For example, EP-A-173901 describes the production of ZSM-5 zeolite whose crystals are "below 0.3 µm" in size. However, the specific zeolites whose production is described are made up of "aggregates of crystallites ranging in size from about 0.1 to 0.3 µm".

U.S. Pat. No. 4,205,053 describes a process for preparing zeolites such as ZSM-5 and ZSM-35. The smallest crystals produced have a size of 0.2 to 0.5 microns, or are lamellae or lamellar intergrowths of about 0.1 µm in size.

U.S. Pat. No. 3,781,226 and U.S. Pat. No. 3,926,782 describe the production of zeolites KL and ZSM-5. Although the size of crystals produced (0.005 to 0.1 µm) appears to be such that it would be expected that the crystals would form a stable colloidal suspension, the crystals form agglomerates having a size of 0.1 to 1 µm and these agglomerates do not form a stable colloidal suspension. A stable colloidal suspension is one in which the crystals or agglomerates do not visibly separate out of the suspension when the suspension is left for a prolonged period e.g. left standing for a month.

U.S. Pat. No. 4,526,879 describes the synthesis of a low sodium zeolite ZSM-5 from a mixture containing sources of an alkali metal oxide, an aluminum oxide, a silicon oxide, and a combination of amine, a halide and a mutual solvent. Although the crystals produced are stated to be 0.05 to about 20 microns in diameter it is believed that the crystals produced are, in fact agglomerates. No means of controlling the crystal size or uniformity is disclosed.

SUMMARY OF THE INVENTION

The present invention provides a molecular sieve comprising single crystals or agglomerates, the crystals or agglomerates having an average largest dimension of 100 nm or less, which molecular sieve has a crystal or agglomerate size distribution such that the variance in the longest dimension is less than 15% of the average longest dimension, which molecular sieve is capable of forming a colloidal suspension.

The particles forming the molecular sieve of the present invention are crystals or agglomerates and are substantially uniform in size. The variance of the largest dimension of the particles is less than 15%, preferably less than 10%, more preferably less than 8% of the average largest dimension of the particles. The largest dimension of the particles, in the case of spherical particles the diameter and, in the case of rhomboid or similar particles e.g. coffin-shaped crystals, is the length of the particle. The variance may be measured e.g. using information depicted by a scanning electron micrograph of the material.

BRIEF DESCRIPTION OF THE DRAWINGS

FIG. 1 shows comparative X-ray diffractograms of products made in accordance with Example 1.

FIG. 3 shows SEM micrographs of products made in accordance with Example 1.

FIG. 4 shows SEM micrographs of products made in accordance with Example 1.

FIG. 5 shows an X-Ray diffractogram and an SEM micrograph of the product made in accordance with Example 2.

FIG. 6 shows an X-Ray diffractogram and an SEM micrograph of a product made in accordance with Example 3.

DETAILED DESCRIPTION OF THE INVENTION

Figure 2:
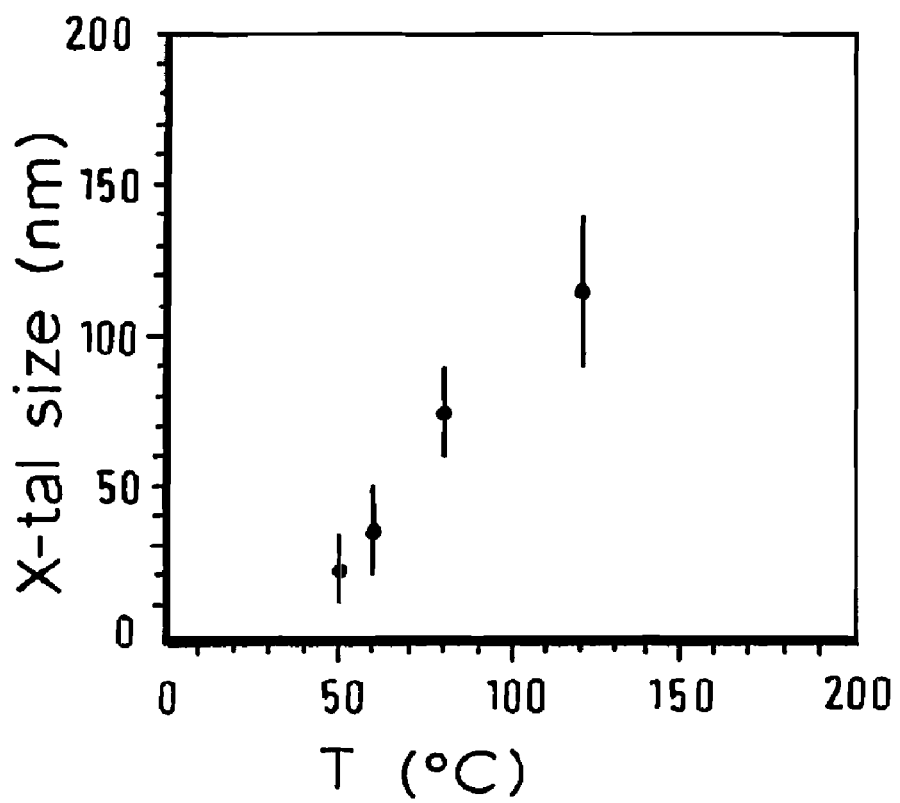
FIG. 2 is a graph showing the effect of temperature on the crystal size of products made in accordance with Example 1.

The present invention relates to any molecular sieve which may be prepared using a source of silica and an organic structure directing agent. Preferred sieves include MFI, MEL or β-type zeolites, e.g. ZSM-5, silicalite 1, silicalite 2 and ZSM-11.

A structure directing agent is a molecule which directs the formation of a given molecular sieve by the so-called "templating effect". The role of organic molecules in molecular sieve synthesis is discussed in Articles published in the literature, e.g. Lok et al, Zeolites 1983, volume 3, pages 282 to 291 and Moretti et al, Chim. Ind. (Milan) 67, No. 1-2, 21 to 34 (1985). The effect of an organic structure directing agent is that in the production of the crystalline framework the organic compound behaves like a template around which the crystalline framework grows, or which causes the crystallisation to be directed to form a particular crystalline framework.

A number of publications relate to the production of zeolites from synthesis mixtures containing organic structure directing agents. EP-A-173901 describes the production of ZSM-zeolite which is synthesised from a mixture containing silica, soda and alumina sources in an aqueous medium containing a polyol such as ethylene glycol, and trace amounts of tetrapropylammonium. The ingredients are mixed at room temperature and pressure and crystallised at temperatures of around 175° C.

U.S. Pat. No. 4,205,053 describes a process for producing large, easily filtered crystals comprising crystallising an aqueous solution containing a source of silica, a nitrogenous template and a substantially colorless organic basic nitrogen compound, different from the template, and being a quaternary ammonium compound having not more than three methyl, three ethyl or three propyl substituents, or being an amine.

The present applicants have surprisingly found that the production of a molecular sieve in which the largest dimension of the particles is controlled, reproducible and on average 100 nm or less can be obtained by ensuring that the silica in the synthesis mixture for the sieve is dissolved at the boiling point of the synthesis mixture. Dissolution of the silica can be achieved by the use of sufficient organic structure directing agent.

Thus the present invention provides a process for preparing a molecular sieve comprising single crystals or agglomerates, the crystals or agglomerates having an average largest dimension of 100 nm or less, which process comprises preparing a boiling aqueous synthesis mixture comprising:

(i) a source of silica, and (ii) an organic structure directing agent in the form of a hydroxide, in an amount sufficient to cause substantially complete dissolution of the silica source in the mixture;

and crystallising the synthesis mixture at 120° C. or less.

The silica is preferably introduced into the synthesis mixture in solid form e.g. as silicic acid.

The organic structure directing agent is introduced into the synthesis mixture in the form of a base, specifically in the form of a hydroxide.

The structure directing agent may be, for example, the hydroxide of tetramethylammonium (TMA), tetraethylammonium (TEA), triethylmethylammonium (TEMA), tetrapropylammonium (TPA), tetrabutylammonium (TBA), tetrabutylphosphonium (TBP), trimethylbenzylammonium (TMBA), trimethylcetylammonium (TMCA), trimethylneopentylammonium (TMNA), triphenylbenzylphosphonium (TPBP), bispyrrolidinium (BP), ethylpyridinium (EP), diethylpiperidinium (DEPP) or a substituted azoniabicyclooctane, e.g. methyl or ethyl substituted quinucilidine or 1,4-diazoniabicyclo-(2,2,2)octane.

Preferred structure directing agents are the hydroxides of TMA, TEA, TPA and TBA.

The structure directing agent should be present in the synthesis mixture such that the silica is substantially completely dissolved in the synthesis mixture at the boiling point of the mixture. Typically, this will require a molar ratio of structure directing agent to silica of 0.2 or more. The amount of structure directing agent necessary to dissolve the silica will, of course, depend on the amount of silica used in the synthesis mixture. The required amount of silica is determined by the molecular sieve structure the synthesis mixture is intended to produce on crystallisation. When the process is used to produce a highly siliceous zeolite such as zeolite β, the molar ratio of structure directing agent to silica can be e.g. 0.5 or more. The amount of structure directing agent required to dissolve the silica in accordance with this process is generally in excess of that required to achieve a structure directing effect.

The process can be used to prepare any molecular sieve which can be crystallised from a synthesis mixture containing an excess of organic structure directing agent. The molecular sieve may be composed mainly of silica, e.g. a silicalite; it may be an aluminosilicate (zeolite) or the aluminium may be partly or wholly replaced by another material such as boron, iron, vanadium, chromium or gallium. Thus the present process may be used to produce borosilicates, ferrosilicates, vanadosilicates or chromosilicates. Examples of sieves which may be produced by the present process include zeolites of MFI type, a silicalite, an MEL-structure e.g. silicalite-2 or ZSM-11, or zeolite-β.

The synthesis mixture therefore optionally contains other raw material required for the synthesis of the desired molecular sieve. For example, if an aluminosilicate or borosilicate is to be produced, then the synthesis mixture further contains a source of alumina or boron. Other materials commonly used in the synthesis of molecular sieves may also be present in the synthesis mixture, e.g. a source of alkali or alkaline earth metal such as sodium, potassium or magnesium. Conveniently the sources of alumina, alkali and alkaline earth metals and so on are introduced into the synthesis mixture in the form of solids, preferably finely divided solids.

The alkalinity of the synthesis mixture may be ensured in terms of the molar ratio $OH^-/SiO_2$, which is preferably 1 or less, and typically less than 0.8. The measurement of $OH^-/SiO_2$ should include all alkali species when calculating the value of $OH^-$; e.g. any alkali species introduced with the alkali metal, and should correct for any acidity ($H^+$) added to the synthesis mixture e.g. resulting from the addition of aluminium sulphate.

The boiling aqueous synthesis mixture may be produced by adding to water the silica, organic structure directing agent and, if present, any other ingredients. The ingredients may be added simultaneously or sequentially.

The synthesis mixture may be formed at room temperature and then brought to boiling point. In another embodiment the ingredients for the synthesis mixture are added simultaneously or sequentially to boiling water. In another embodiment, one or more of the ingredients may be added to water to form an aqueous solution, which solution is then brought to boiling point and the remaining ingredients are added whilst the solution is at boiling point.

The synthesis mixture after boiling may then be crystallised at a temperature of 120° C. or less. It is preferred that the synthesis mixture is cooled to around room temperature before being brought to crystallisation temperature. This allows the mixture to be corrected at room temperature for water loss resulting from the boiling. The exact composition of the synthesis mixture can then be ascertained accurately. Surprisingly the synthesis solutions prepared such that the silica is substantially completely dissolved are so active towards crystallisation that very low crystallisation temperatures can be used.

The crystal or agglomerate size can be varied by varying the crystallisation temperature. The lower the temperature the smaller the particle size. For zeolites containing a source of alumina, the particle size can further be varied by varying the amount of alumina present. However, the effect of varying the amount of alumina is not consistent from zeolite to zeolite. For example, it appears that increasing the alumina content of a synthesis mixture for an MFI-type zeolite results in an increase in crystal size. On the other hand, increasing the aluminum content of a synthesis mixture for producing a zeolite β results in a decrease in crystal size. Thus for a particular composition of synthesis mixture, i.e. one containing specified amounts of synthesis ingredients, the particle size can be selected quite accurately by selecting an appropriate crystallisation temperature.

It has also been noticed that the highly siliceous zeolite, zeolite β, may be produced in accordance with this process using a particularly small amount of alumina e.g. 0.0045 moles $Al_2O_3$ to 1 mole $SiO_2$, and a surprisingly low crystallisation temperature e.g. as low as 70° C.

The crystals or agglomerates produced by this process may be used e.g. to seed the production of other zeolites, especially in accordance with the process described in our co-pending application no. 9122498.0.

The following examples illustrate the invention.

Example 1

Synthesis of Nanometer-Sized MPI (Silicalite) Crystals

Preparation of synthesis solution. The weight of each reactant is given in grams and the product number of each reactant is given in brackets after the Manufacturer's/Supplier's name.

TPA OH solution (20% in water) 406.34 (Fluka 88110)

Silicic acid powder (10.2 wt % $H_2O$) 87.94 (Baker 0324-5)

NaOH pellets (98.4%) 5.73 (Baker 0402)

The TPA-solution was weighed in a 1 liter glass beaker, the NaOH was added and the solution stirred at room temperature until the NaOH dissolved. Next, the silicic acid was added and the mixture heated to boiling whilst vigorously stirring. Heating was continued until a clear solution was obtained. The solution was cooled to room temperature and the weight loss due to the boiling was corrected with demineralized water.

The molar composition of the synthesis mixture was:
$0.53Na_2O/1.52(TPA)_2O/10SiO_2/143H_2O$
The $OH^-/SiO_2$ molar ratio was 0.41.

Crystallisation:

The synthesis solution was divided into 3 portions which were crystallized at respectively 120° C. for 22 hours, 80° C. for 25.5 hours and at 60° C. for 9 days. The crystallization at 120° C. was done in a 1 liter stainless steel autoclave; the other crystallizations were done in 250 ml plastic bottles. The crystals were separated from the mother liquor using a high-speed centrifuge. Upon centrifuging the crystals appeared as a bluish transparent gel-like mass on the bottom of the centrifuge beakers.

To wash the product, the crystals were redispersed in demineralized water using an ultrasonic bath and were subsequently centrifuged. The washing was repeated until the pH of the last wash water was about 10. After the last washing step the crystals were again dispersed in about 100 ml of the demineralized water. After standing for about a week the 80° C. and 60° C. crystals did not show a tendency to settle down on the bottom of the container, therefore the 80° C. and 60° C. crystals were considered as "colloidal zeolites". Small portions (~25 grams) of the zeolite suspensions were evaporated to dryness (16 hours at 120°) and the resulting solids were air calcined for 24 hours at 550° C. X-ray diffraction of the products all showed the pattern of silicalite-1. To determine the crystal size by SEM a few microliters of the washed zeolite slurries were diluted with about 0.5 ml of water and about 0.5 ml of ethanol. Of this mixture a few microliters were evaporated on a SEM specimen-stub.

Crystallization of MFI at 50° C.

An identical synthesis mixture as described above was, after filtration through a 0.45 micron Millipore filter, crystallized at 50° C. After 5 days into heating it was observed that the synthesis solution showed a very faint bluish hue, indicating the formation of the first visible crystals. This in turn indicates that, given the low temperature, the formation of the zeolite is surprisingly fast. Upon further heating at 50° C. the hue became more and more dominant. After 14 days into heating the crystallization was stopped. The product was washed and recovered as described above. A small portion of the colloidal slurry was dried and calcined in the same way as described above.

Comparative X-Ray diffractograms of the 120° C. and 50° C. crystals are given in FIG. 1.

SEM micrographs showed that the crystallite size strongly depends on the crystallization temperature. The effect of the crystallization temperature on the crystallite size is shown in FIG. 2.

From this graph can be seen that at 50° C. the size of the crystals is as small as about 25 nanometers. Comparative 104,000*SEM micrographs of the 120° C. and 50° C. crystals are shown in FIG. 3.

Crystallization at 50° C. Followed by Crystallization at 100° C.:

A small portion (about 10 ml) of the reaction slurry obtained after 14 days into heating at 50° C. was aged at 100° C. during 16 hours. After this extra aging period it appeared that the opacity of the 100° C. treated reaction slurry was increased vs the "50° C.-opacity", indicating that the reaction mixture was still active for the formation of new crystallites. SEM micrographs of the 100° C. treated reaction mixture surprisingly showed that the size of crystals was about the same as the 50° C. crystals, namely about 25 nanometers. This could suggest that the 50° C. reaction mixture contained crystal nuclei which were significantly smaller than 25 nanometers. Comparative 104,000*SEM micrographs of the 50° C. and the 50° C./100° C. product are shown in FIG. 4. The above observations suggest that a "low-temperature" mother liquor can be reused to give nanometer sized crystals by simply heating up the clear centrifuged mother liquor at an elevated temperature (i.e. at a higher temperature than that at which the mother liquor was previously held).

Example 2

Synthesis of Nanometer Sized MEL-Type Zeolite

A synthesis solution with a molar composition of:
$0.55Na_2O/1.26(TBA)_2O/10SiO_2/150H_2O$ and having, therefore an $OH^-/SiO_2$ molar ratio of 0.36, was prepared as follows:

Preparation synthesis mixture (weight reactants in grams):
A. Tetrabutylammonium hydroxide 111.24 (Flukka 86881) (40% in water)
B. $H_2O$ 111.05
C. Silicic acid powder 45.74 (Baker 0324-5) (10.2% water)
D. NaOH (98.4%) 3.03 (Baker 0402)

A and B were mixed in a glassbeaker, D was added and the material again mixed until D was dissolved. C was added and the mixture heated to boiling whilst vigorously stirring. The mixture continued to be boiled for about 10 minutes; the resulting solution was cooled to room temperature and the weight loss corrected with demineralized water. After cooling to room temperature the solution was slightly hazy. The solution was transferred into 250 ml plastic beaker and the beaker was placed in a 90° C. oilbath. The neck of the beaker was connected with a reflux condenser.

After about 2 days into heating formation of crystals was observed, this was indicated by a change in the appearance of the solution, (whitish hue). After 4.5 days into heating the crystallization was stopped. The product was washed and recovered as described above in Example 1.

X-Ray diffraction showed that the product had the pattern of silicalite-2 (MEL). SEM micrographs showed that the product consisted of rice-like agglomerates with a size between 100 and 200 nanometers.

The X-Ray diffractogram and a 104,000*SEM micrograph are given in FIG. 5.

The preparation was repeated using the same procedure to prepare a synthesis mixture having the same molar composition, i.e.

0.55Na$_2$O/1.26(TBA)$_2$O/10SiO$_2$/150H$_2$O.

This synthesis mixture was maintained at 67.5° C. for 255 hours. As expected the crystal size of the product was less than that produced using a crystallisation temperature of 90° C. The crystal size was about 50 nm.

Example 3

Synthesis of Nanometer-Sized Zeolite β

A synthesis mixture with a molar composition of
2.79(TEA)$_2$O/0.04Al$_2$O$_3$/10SiO$_2$/76H$_2$O was prepared as follows:

Preparation of Synthesis Mixture (Weight of Reactants in grams):

A. Tetra ethylammonium hydroxide 105.36 (Fluka 86632) (40% in water)
B. Al(NO$_3$)$_3$ 9H$_2$O 1.50 (Baker 0.006)
C. Silicic acid powder 34.32 (Baker 0324-5) (10.2% H$_2$O)

B was added to A and mixed until a clear solution was obtained. C was added to the mixture of A and B and this was then heated up to boiling with vigorous stirring. Boiling was contained for about 10 minutes, the solution was then cooled to room temperature and the weight loss due to the boiling was corrected with demineralized water. A slightly opaque solution was obtained.

The synthesis solution was transferred to a 250 ml plastic beaker and the beaker was placed in a 99° C. oilbath. The neck of the beaker was connected with a reflux condenser. After 4 days into heating the whole solution was whitish opaque indicating the formation of crystalline material. After 10 days into heating the crystallization was stopped. The product was washed several time with demineralized water until the pH of the last wash water was 10.0. The product was dried overnight at 120° C. X-Ray diffraction showed that the product was excellently crystalline zeolite β. SEM showed that the product consisted of very uniform spherical crystallites with a size between 200 and 400 nanometers.

In a second synthesis two parameters were varied, namely the alumina content of the synthesis mixture was increased from 0.04 moles/10 moles SiO$_2$ to 0.06 moles/10 moles SiO$_2$, hence the composition of the synthesis mixture was:

2.79 (TEA)$_2$0/0/06 Al$_2$O$_3$/10SiO$_2$/76H$_2$O, and the crystallisation temperature was decreased from 99° C. to 85° C.

The synthesis mixture was prepared with the same ingredients and in the same way as described above. After 5 days into heating at 85° C. the whole solution was whitish opaque indicating that the formation of crystals had started. After 11 days into heating the crystallization was terminated. The product was washed/recovered as described above.

X-Ray diffraction showed that the product was excellently crystalline zeolite β and according to SEM the crystals had a size of about 90 nanometer. The X-Ray diffractogram and a 104,000*SEM micrograph are shown in FIG. 6.

A third experiment was done to observe what happened if the synthesis solution did not contain added alumina, hence the molar composition of the synthesis solution was:

2.79(TEA)$_2$)/10SiO$_2$/76H$_2$O

The solution was, like in the first synthesis, aged at 99° C. After 4 days into heating white solids were formed at the bottom of the beaker while the supernatant liquor was transparent. After 10 days into heating the whole solution had turned into a viscous white slurry. X-Ray diffraction showed that the product had the typical pattern of a layered silica and did not contain a trace of zeolite β.

From these experiments can surprisingly be concluded that:

the addition of only a small amount of alumina, e.g. 0.004 moles Al$_2$O$_3$/mole SiO$_2$ the crystallisation completely shifts from non-β to β.

zeolite β can crystallize at temperatures such as 85° C., significantly lower than had previously been suggested (T>100° C.).

Example 4

Crystallisation of Zeolite β at 70° C.

A synthesis mixture was prepared using the following ingredients (weight of reactants in grams):

TEAOH (40% in water) 105.37 (Fluka 86632)

Al(NO$_3$)$_3$ 9H$_2$O 3.00 (Baker 0.006)

Silicic acid powder (10.2% H$_2$O) 34.33 (Baker 0324-5)

The Al species was predissolved in the TEA solution at room temperature. Next the SiO$_2$ was added. The mixture was heated to boiling with vigorous stirring until the silica was dissolved. Boiling was continued far another ten minutes. The solution was cooled to room temperature and the weight loss due to boiling was corrected with water.

The molar composition of the synthesis mixture was:
2.79(TEA)$_2$O/0.080Al$_2$O$_3$/10SiO$_2$/76H$_2$O Crystallisation:

140.13 grams of the synthesis mixture was transferred to a 200 ml flask, which was placed in a room temperature oil bath and the neck of the flask was connected with a condenser. The oil bath was heated within about 30 minutes to 70° C. and maintained at that temperature for 25 days.

Observations During Heating:

Days 1 to 14: No change in appearance.

Days 14 to 18: Solution very gradually took on a whitish hue.

Days 18 to 25: Whitish hue slowly turns into a clear whitish haziness. Crystals did not settle on the bottom of the flask.

After 25 days into heating half of the synthesis mixture was removed to recover the product. The recovery was carried out by washing the product three-times with 200 ml of water. The product was dried overnight at 105° C.

Figure 7:
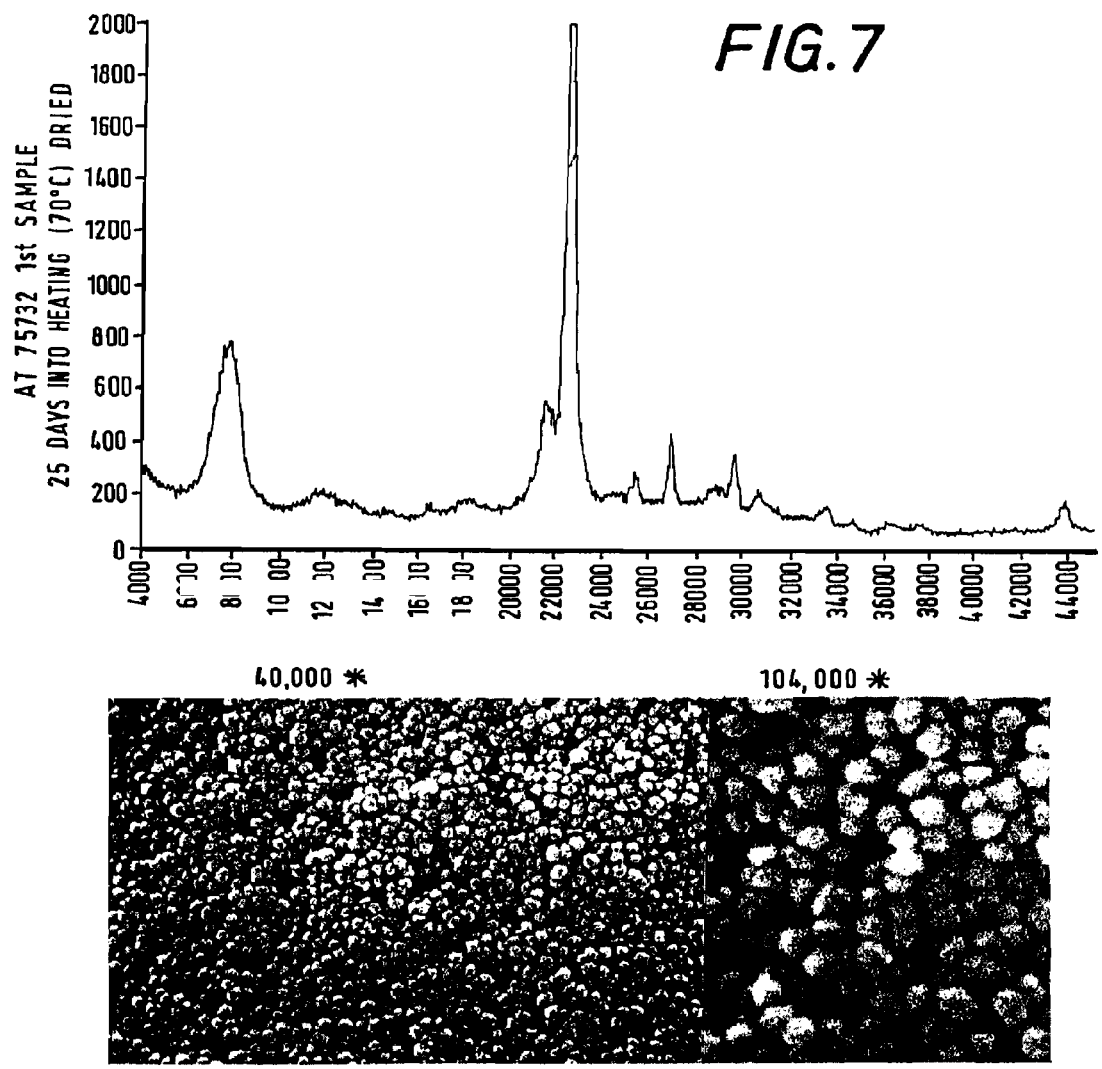
FIG. 7 shows an X-Ray diffractogram and an SEM micrograph of the product made in accordance with Example 4.

XRD showed that the product was pure zeolite β. The XRD and SEM micrographs are shown in FIG. 7. The average crystal size was around 50 nanometers.

Comparative Example 1

The process of Example 2 of U.S. Pat. No. 3,781,226 was repeated. According to U.S. Pat. No. 3,781,226 the material produced had the following chemical composition (expressed as mole ratios)

1.5(TPA$_2$O):0.86(Na$_2$O):73.4(SiO$_2$):Al$_2$O$_3$

Figure 8:
FIG. 8 shows an SEM micrograph of the product made in accordance with comparative Example 1.

The product was stated to have a crystal size of about 0.04 micron. An SEM micrograph (magnification 10000*) of the material produced by the applicants when this example was repeated is shown in FIG. 8. The product comprised agglomerates with a size between 0.3 and 1.5 μm. This would not form a stable collodial suspension.

Comparative Example 2

Figure 9:
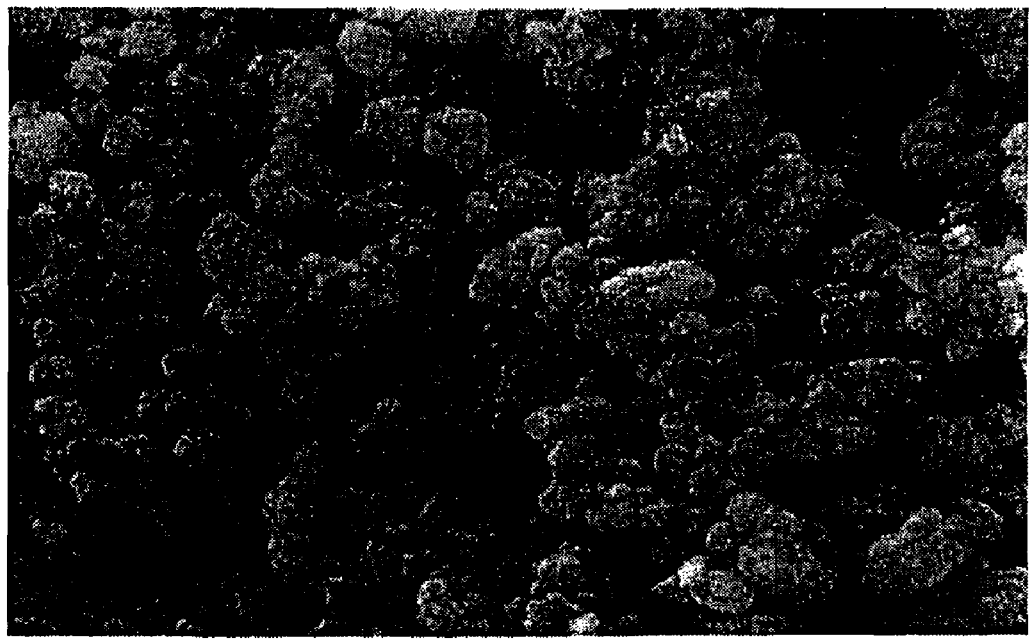
FIG. 9 shows an SEM micrograph of the product made in accordance with comparative Example 2.

The process of Example 2 of U.S. Pat. No. 3,926,782 was repeated. According to U.S. Pat. No. 3,926,782 the product was 90% ZSM-5 and comprised crystallite agglomerates of 0.1 to 0.3 μm in diameter. FIG. 9 shows an SEM micrograph (magnification 10000*) of the product obtained when the applicants repeated this example. It can be seen that the product comprised agglomerates of 0.2 to 1.5 μm in size. This would not form a stable colloidal suspension.

The invention claimed is:

1. A molecular sieve comprising single crystals or agglomerates, the crystals or agglomerates having an average largest dimension of 100 nm or less which molecular sieve has a crystal or agglomerate size distribution such that the variance in the longest dimension is less than 15% of the average longest dimension, and is capable of forming a stable colloidal suspension.

2. A molecular sieve as claimed in claim 1 in which the variance in the longest dimension is less than 10% of the average longest dimension.

3. A molecular sieve as claimed in claim 1 which is an MFI, MEL or beta type zeolite.

4. A molecular sieve as claimed in claim 3 which is an MFI type zeolite.

5. A molecular sieve as claimed in claim 3 which is an MEL type zeolite.

6. A molecular sieve as claimed in claim 3 which is a beta type zeolite.

7. A molecular sieve as claimed in claim 1 having an average crystal or agglomerate size in the range of about 25 to 80 nm.

8. A stable colloidal suspension containing a colloidal suspension of a molecular sieve comprising single crystals or agglomerates, the crystals or agglomerates having an average largest dimension of 100 nm or less which molecular sieve has a crystal or agglomerate size distribution such that the variance in the longest dimension is less than 15% of the average longest dimension.

9. The colloidal suspension of claim 8 in which the average variance of the longest dimension is less than 10% of the average longest dimension.

10. The colloidal suspension of claim 8 in which the colloid is an MFI, MEL or beta-type zeolite.

11. The colloidal suspension of claim 10 in which the colloid is an MFI type zeolite.

12. The colloidal suspension of claim 10 in which the colloid is an MEL type zeolite.

13. The colloidal suspension of claim 10 in which the colloid is a beta type zeolite.

14. The colloidal suspension of claim 10 wherein said colloid has an average crystal or agglomerate size of about 25 to 90 nm.

15. A process for preparing a molecular sieve comprising single crystals or agglomerates having an average largest dimension of 100 nm or less and having a crystal or agglomerate size distribution such that the variance in the longest dimension is less than 15% of the average longest dimension, and which crystals or agglomerates are capable of forming a stable colloidal suspension, comprising:
   a) forming a synthesis mixture comprising a source of silica, an organic structure directing agent in the form of a hydroxide and water, said agent being present in said mixture in an amount sufficient to cause substantially complete dissolution of the silica source present in the mixture;
   b) boiling said synthesis mixture for a period of time until said source silica is substantially completely dissolved; thereby forming a clear solution; and
   c) crystallizing said synthesis mixture at an elevated temperature of 120° C. or less for a period of time sufficient to form said molecular sieve.

16. A process according to claim 15 in which the synthesis mixture further comprises a source of aluminum, gallium, boron, chromium, iron, vanadium, alkali metal, or alkaline earth metal.

17. A process according to claim 15 in which the synthesis mixture comprises ingredients present in amounts sufficient to produce an MFI or MEL zeolite on crystallization of the synthesis mixture.

18. A process according to claim 15 for the production of zeolite beta in which the synthesis mixture also contains a source of aluminum.

19. A process according to claim 18 in which the silica source is added to the synthesis mixture in the form of a solid and the synthesis mixture is subject to vigorous stirring.

20. A process according to claim 19 in which the silica source is silicic acid.

21. A process according to claim 15 in which the molar ratio of the structure directing agent to silica in the synthesis mixture is 0.2 or greater.

22. A process according to claim 15 in which the organic structure directing agent is tetramethylammonium hydroxide, tetraethylammonium hydroxide, tetrapropylammonium hydroxide or tetrabutylammonium hydroxide.

23. A process according to claim 15 in which the alkalinity of the initial synthesis mixture, expressed as a molar ratio of $OH/SiO_2$, is 1 or less.

24. A process for preparing a molecular sieve comprising single crystals or agglomerates having an average largest dimension of 100 nm or less and having a crystal or agglomerate size distribution such that the variance in the longest dimension is less than 15% of the average longest dimension, and which crystals or agglomerates are capable of forming a colloidal suspension, comprising:
   a) forming a synthesis mixture comprising a source of silica, an organic structure directing agent in the form of a hydroxide and water, said agent being present in said mixture in an amount sufficient to cause substantially complete dissolution of the silica source present in the mixture;
   b) boiling said synthesis mixture for a period of time until said silica source is substantially completely dissolved; and
   c) crystallizing said synthesis mixture at a temperature of about 90° C. or less and for a period of time sufficient to form molecular sieve.

25. The process of claim 24 wherein said crystallization temperature is in the range of about 50 to 90° C. and said molecular sieve is a beta type zeolite.

26. The process of claim 24 wherein said molecular sieve has an average crystal or agglomerate size of about 25 to 90 nm.

* * * * *